United States Patent
Nagai et al.

(10) Patent No.: US 10,460,824 B2
(45) Date of Patent: Oct. 29, 2019

(54) SEMICONDUCTOR APPARATUS WITH REDUCED RISKS OF CHIP COUNTERFEITING AND NETWORK INVASION

(71) Applicant: Hiroshi Watanabe, Yokohama-shi, Kanagawa-ken (JP)

(72) Inventors: Yukihiro Nagai, Sapporo (JP); Hiroshi Watanabe, Yokohama (JP); Riichiro Shirota, Fujisawa (JP)

(73) Assignee: Hiroshi Watanabe, Yokohama-shi (JP)

( * ) Notice: Subject to any disclaimer, the term of this patent is extended or adjusted under 35 U.S.C. 154(b) by 244 days.

(21) Appl. No.: 15/416,160

(22) Filed: Jan. 26, 2017

(65) Prior Publication Data

US 2017/0221581 A1    Aug. 3, 2017

(30) Foreign Application Priority Data

Feb. 3, 2016   (JP) ................................ 2016-019153

(51) Int. Cl.
  *G11C 29/34* (2006.01)
  *G11C 29/02* (2006.01)
  (Continued)

(52) U.S. Cl.
  CPC .............. *G11C 29/34* (2013.01); *G06F 21/44* (2013.01); *G06F 21/577* (2013.01); *G06F 21/73* (2013.01);
  (Continued)

(58) Field of Classification Search
  CPC ... G11C 29/022; G11C 29/025; G11C 29/027; G11C 29/1201; G11C 29/16;
  (Continued)

(56) References Cited

U.S. PATENT DOCUMENTS 7,117,414 B2   10/2006 Hartmann
9,292,710 B2   3/2016 Kim et al.
(Continued)

FOREIGN PATENT DOCUMENTS

JP   2013131868 A   7/2013
JP   2015139010 A   7/2015
(Continued)

*Primary Examiner* — Kyle Vallecillo
(74) *Attorney, Agent, or Firm* — Alan D. Kamrath; Karin L. Williams; Mayer & Williams PC

(57) ABSTRACT

A semiconductor apparatus includes a semiconductor chip, with the semiconductor chip including a modular region and a test circuit. The modular region includes a plurality of modular areas each including a memory cell array with redundant bit lines and a peripheral memory area storing at least redundant addresses. The test circuit retrieves the redundant addresses intrinsic to the semiconductor chip. The distribution of the redundant addresses is randomly formed related to a part or an entirety of the modular area of the modular region. The distribution of the retrieved redundant addresses is irreversible, with a random number representing physical properties intrinsic to the semiconductor chip and providing copy protection. When another semiconductor chip uses the distribution of the retrieved redundant addresses the another semiconductor chip will malfunction. The test circuit outputs a random number generated from the distribution of the retrieved redundant addresses according to a specification code received from a physical-chip-identification measuring device.

9 Claims, 10 Drawing Sheets

(51) Int. Cl.

| | |
|---|---|
| *G11C 29/00* | (2006.01) |
| *G06F 21/57* | (2013.01) |
| *G11C 29/18* | (2006.01) |
| *G06F 21/44* | (2013.01) |
| *G06F 21/73* | (2013.01) |
| *G11C 7/24* | (2006.01) |
| *G09C 1/00* | (2006.01) |
| *G11C 29/12* | (2006.01) |
| *G11C 29/16* | (2006.01) |
| *G11C 29/24* | (2006.01) |
| *G11C 29/26* | (2006.01) |
| *G11C 29/36* | (2006.01) |
| *G11C 29/44* | (2006.01) |
| *G11C 29/56* | (2006.01) |
| *H04L 9/08* | (2006.01) |
| *H04L 9/32* | (2006.01) |

(52) U.S. Cl.
CPC .............. *G09C 1/00* (2013.01); *G11C 7/24* (2013.01); *G11C 29/022* (2013.01); *G11C 29/025* (2013.01); *G11C 29/027* (2013.01); *G11C 29/1201* (2013.01); *G11C 29/16* (2013.01); *G11C 29/18* (2013.01); *G11C 29/24* (2013.01); *G11C 29/26* (2013.01); *G11C 29/36* (2013.01); *G11C 29/44* (2013.01); *G11C 29/56008* (2013.01); *G11C 29/78* (2013.01); *G11C 29/783* (2013.01); *H04L 9/0866* (2013.01); *H04L 9/3278* (2013.01); *G06F 2221/034* (2013.01); *G11C 2029/1202* (2013.01); *G11C 2029/1204* (2013.01); *G11C 2029/1806* (2013.01); *G11C 2029/4402* (2013.01); *G11C 2029/5606* (2013.01); *H04L 2209/12* (2013.01)

(58) Field of Classification Search
CPC ......... G11C 29/18; G11C 29/24; G11C 29/26; G11C 29/34; G11C 29/36; G11C 29/44; G11C 29/56008; G11C 29/78; G11C 29/783; G11C 7/24; G11C 2029/1202; G11C 2029/1204; G11C 2029/1806; G11C 2029/4402; G11C 2029/5606; G06F 21/30; G06F 21/45; G06F 21/57; G06F 21/577; G06F 21/60; G06F 21/606; G06F 21/62; G06F 21/6209; G06F 21/6218; G06F 21/64; G06F 2221/034; G06F 21/44; G06F 21/73; G09C 1/00; H04L 9/0866; H04L 9/3278; H04L 2209/12; G11B 20/000086; G11B 20/00137

See application file for complete search history.

(56) References Cited

U.S. PATENT DOCUMENTS

| | | | |
|---|---|---|---|
| 9,729,324 B2 | 8/2017 | Yamamoto et al. | |
| 2002/0168815 A1* | 11/2002 | Hartmann | G11C 16/20 438/201 |
| 2003/0088785 A1 | 5/2003 | Fujiwara et al. | |
| 2004/0162959 A1* | 8/2004 | Adelmann | G06F 21/73 711/202 |
| 2006/0056246 A1 | 3/2006 | Doi | |
| 2012/0044777 A1 | 2/2012 | Fujiwara et al. | |
| 2013/0047209 A1 | 2/2013 | Satoh et al. | |
| 2014/0070212 A1 | 3/2014 | Fujiwara et al. | |
| 2014/0100807 A1* | 4/2014 | Rosenblatt | G06F 21/44 702/82 |
| 2014/0165141 A1* | 6/2014 | Chellappa | G06F 21/44 726/2 |
| 2014/0269122 A1 | 9/2014 | McCarthy | |
| 2015/0074433 A1 | 3/2015 | Zhu et al. | |
| 2015/0163211 A1* | 6/2015 | Chellappa | H04L 63/08 713/155 |
| 2015/0207627 A1 | 7/2015 | Yamamoto et al. | |
| 2016/0154979 A1 | 6/2016 | Kim et al. | |
| 2017/0018317 A1* | 1/2017 | Kim | G11C 29/76 |
| 2017/0031412 A1* | 2/2017 | Gendler | G06F 15/163 |

FOREIGN PATENT DOCUMENTS

| | | |
|---|---|---|
| JP | 2015201884 A | 11/2015 |
| WO | WO2011118548 A1 | 9/2011 |

* cited by examiner

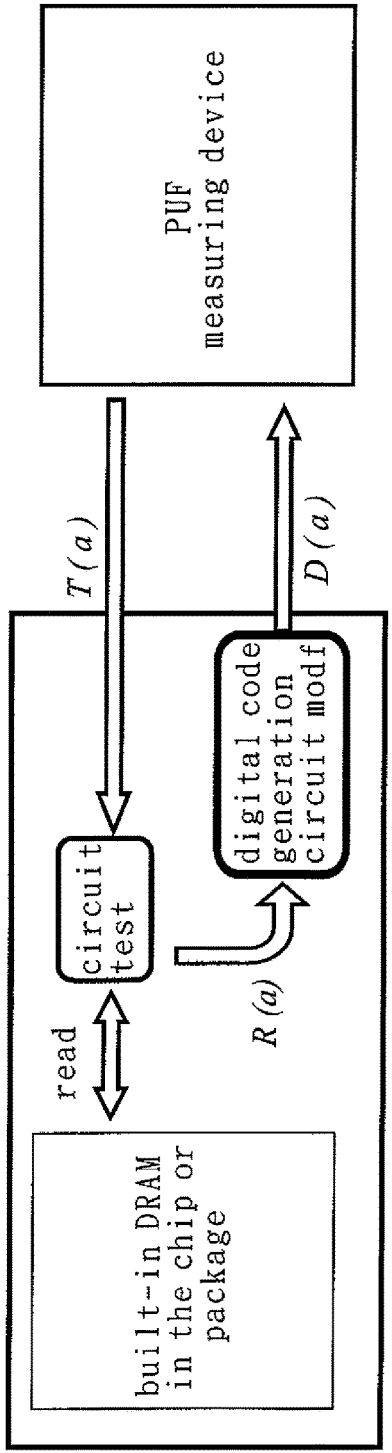
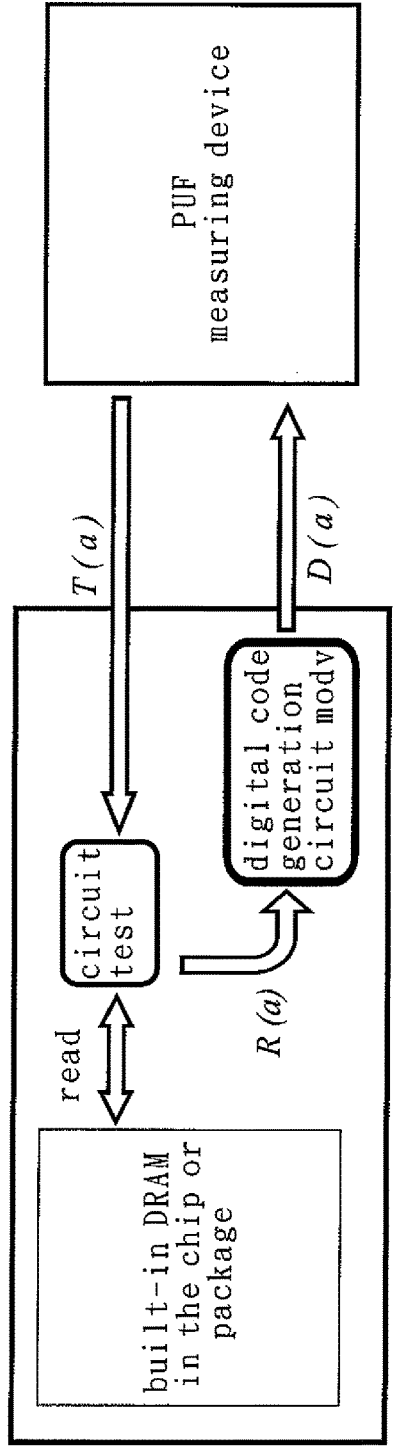

| T(a) | test | R(a) | C(i) | modf | D(i,a) |
|---|---|---|---|---|---|
| TM—A | → | 0110·····1100 | R#T·····&SDF | → | OpR·····QES'Q |
| TM—B | → | 1010·····0011 | $OP·····QRS@ | → | #$Z·····RAPO |
| TM—C | → | 0111·····1000 | "XB·····¥_ \| } | → | !"P·····Q'>_ |

FIG. 13

| T(a) | test | R(a) | C(i) | modv | D(i,a) |
|---|---|---|---|---|---|
| TM—A | → | 0110·····1100 | R#T·····&SDF | → | OpR·····QES'Q |
| TM—B | → | 1010·····0011 | $OP·····QRS@ | → | #$Z·····RAPO |
| TM—C | → | 0111·····1000 | "XB·····¥_ \| } | → | !"P·····Q'>_ |

FIG. 14

| T(a) | test | R(a) | modf | D(a) |
|---|---|---|---|---|
| TM—A | → | 0110·····1100 | → | OpR·····QES'Q |
| TM—B | → | 1010·····0011 | → | #$Z·····RAPO |
| TM—C | → | 0111·····1000 | → | !"P·····Q'>_ |

FIG. 15

| T(a) | test | R(a) | modv | D(a) |
|---|---|---|---|---|
| TM—A | → | 0110·····1100 | → | OpR·····QES'Q |
| TM—B | → | 1010·····0011 | → | #$Z·····RAPO |
| TM—C | → | 0111·····1000 | → | !"P·····Q'>_ |

FIG. 16

| T(a) | test | R(a) = D(a) |
|---|---|---|
| TM—A | → | 0110·····1100 |
| TM—B | → | 1010·····0011 |
| TM—C | → | 0111·····1000 |

FIG. 17

SEMICONDUCTOR APPARATUS WITH REDUCED RISKS OF CHIP COUNTERFEITING AND NETWORK INVASION

CROSS REFERENCE TO RELATED APPLICATIONS

The application claims the benefit of Japanese application serial No. 2016019153, filed on Feb. 3, 2016, and the subject matter of which is incorporated herein by reference.

BACKGROUND OF THE INVENTION

1. Field of the Invention

The present invention generally relates to a semiconductor apparatus and, more particularly, to a semiconductor apparatus using a physical-chip-identification measuring device.

2. Description of the Related Art

The highest advanced security is necessary to protect an information management system containing personal information and confidential communications of companies and the government, the control system of production facilities to manage numberless industrial equipment, and the communication network system inside military architectures. In this event, those networks may be disconnected from the external networks. However, it may be impossible to completely terminate access from external network because a series of maintenance may be necessary, which, for example, is the maintenance of apparatuses used in the facilities and the update procedure of the programmable logic controller (PLC) to control those apparatuses. Although it may be necessary to enhance security using high-level encryption technologies, it is most difficult to implement within every machine in each facility with the most advanced security technologies. Therefore, it may be unclear when and how a backdoor was opened and if information leakage occurred. Indeed, plenty of cases have been reported such as an information leakage or a computer virus infection inside the facilities.

In closed networks, the termination of access from external networks may delay updates of the system. This may cause the security of closed networks to be vulnerable. In particular, it may be unable to update the system for many special machines. A great amount of human resources may be necessary to completely control and manage the equipment and machines in the facilities. Accordingly, the cost of countermeasures may be substantially increased.

Elements of the network of machines may be IC chips (Semiconductor chips). In a similar way as finger prints or the retina of a human being are used to identify a person, plenty of new technologies have been produced to identify one semiconductor chip from another. These technologies may prevent counterfeit chips by using the physical properties intrinsic to each chip using "Physical-chip-identification" (which is referred to as PCID hereinafter). In conventional security technologies, if copy protection is broken, it may be easy to copy digital data such as IDs or encryption keys which have been extensively used. However, PCID makes it extremely hard to copy digital data. In general, PCID may be regarded as a sufficient advantage to defenders of network against attackers.

Plenty of utilization methods of PCID measuring devices to identify semiconductor chips have been proposed. However, most of them use the generation of random numbers by monitoring the physical properties of the semiconductor chips. In constructing a security system, the utilization method on the network should be considered. For example, if one semiconductor chip counterfeits the identification of another chip, the counterfeit chip may lie between chips on the network and break the copy protection function using the physical random number intrinsic to chips.

The means of generating random numbers for PCID with physical properties of semiconductor chip may be broadly divided into two methods. One method is a circuit PCID which utilizes e-variance in circuits. The other is manufacturing a PCID which utilizes the variance in microscopic structures other than circuits (see Japan Patent Publication No. 2015-201884). The circuit PCIDs may be further divided into a delay PCID which utilizes the variance in wiring delay of circuits (see PCT Patent Publication No. 2011118548A1) and a metastability PCID which utilizes the metastability of circuits (see Japan Patent Publication No. 2013-131868). The delay PCID, more in detail, may generate random numbers using uncontrollable variance of the operation timing of a plurality of circuits integrated in IC based on the same specification of the design. Typical examples to be used for the delay PCID may be arbiter circuits, glitch circuits, ring oscillation circuits, and so forth. Typical examples to be used for the metastable PCID may be, mainly, static random access memories (SRAM hereinafter) and a latched circuit (i.e., butterfly circuit). A common weakpoint of the circuit PCIDs may be that the circuit function is sensitive to an external environment such as temperature and the output is then unstable and has a lower protection against a fault attack. Further, a common weak point of the delay PCIDs may be a small individual difference of those circuits. Accordingly, additional amplifiers or temperature sensor circuits may be indispensable, which may increase a required load for the circuit design. The length of PCID code may be thus limited and shorter. In this way, the number of semiconductor chips to be identified may be limited even with the validation of the random output, and may mean that the circuit PCID is insufficient in the Internet-of-Things (IoT hereinafter) in which everything may be connected to and by the network. The manufacturing PCIDs may utilize a manufacturing variance, such as a random disconnection of an interlayer conducting via which may be integrated on chip on purpose. However, a special structure which has not been shown in the conventional semiconductor products may be necessary to be integrated and then increase the required load of the manufacturing process. Indeed, this may be a high hurdle to widespread the manufacturing PCIDs in the majority of IoT. There may be a similar example to the manufacturing PCID, in which the random number data intrinsic to a semiconductor chip to be identified may be written in the inner memory area of the semiconductor chip to be identified in advance (see Japan Patent Publication No. 2015-139010). However, this may also require an additional load on the memory cell area and increase the chip cost.

SUMMARY OF THE INVENTION

It is therefore the objective of this invention to provide, in the PCID communication function of semiconductor chips, an identification method with less risk of chip counterfeiting and invasion into the network.

The problems of small individual difference, unstable outputs, the sensitivity to temperature change, and the increase of cost due to required load of additional cells or circuits for PCID, which are well-known in the conventional PCID technologies, may be all resolved.

In one embodiment, a semiconductor apparatus including a semiconductor chip is disclosed. The semiconductor chip includes a modular region and a test circuit. The modular region includes a plurality of modular areas each including a memory cell array with redundant bit lines and a peripheral memory area storing at least redundant addresses. The test circuit retrieves the redundant addresses intrinsic to the semiconductor chip. The distribution of the redundant addresses is randomly formed relating to a part or a whole of the modular area of the modular region. The test circuit outputs a random number generated from physical properties intrinsic to the semiconductor chip according to a specification code received from a PCID measuring device.

The semiconductor chip further includes a digital code generation circuit. The digital code generation circuit generates an output identification code using the random number according to a specified manner.

The test circuit combines the random number with an input identification code for the digital code generation circuit to generate the output identification code. The input identification code is received from the PCID measuring device.

The digital code generation circuit is an incorporated circuit inside the semiconductor chip and is program-modifiable.

The digital code generation circuit generates the output identification code according to the random number. The output identification code is sent to the PCID measuring device.

The digital code generation circuit generates the output identification code according to the random number. The output identification code is sent to the PCID measuring device.

The modular area is a semiconductor memory area.

The modular area that generates the random number is a semiconductor memory area.

The semiconductor chip is packed into a package. The output identification code is used as an output identification code of the package.

In still a further embodiment, an identification method of a semiconductor chip using a PCID measuring device is disclosed. The identification method includes sending a specification code from the PCID measuring device to the semiconductor chip, outputting an output identification code from the semiconductor chip, receiving the output identification code by the PCID measuring device, and identifying the semiconductor chip by the PCID measuring device.

In still a further embodiment, an identification method of a semiconductor chip using a PCID measuring device is disclosed. The identification method includes sending a specification code and an input identification code from the PCID measuring device to the semiconductor chip, outputting an output identification code from the semiconductor chip, receiving the output identification code by the PCID measuring device, and identifying the semiconductor chip by the PCID measuring device.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 3 is an illustration describing an example of a method to generate an output identification code from an input identification code with regard to a PCID measuring device of the present invention and the chip to be identified.

FIG. 4 is an illustration describing an example of a method to generate an output identification code from an input identification code with regard to a PCID measuring device of the present invention and the chip to be identified.

FIG. 13 is an illustration describing an exemplary embodiment of the function corresponding to FIG. 1 and Eq. 1.

FIG. 14 is an illustration describing an exemplary embodiment of the function corresponding to FIG. 2 and Eq. 2.

FIG. 15 is an illustration describing an exemplary embodiment of the function corresponding to FIG. 3 and Eq. 3.

FIG. 16 is an illustration describing an exemplary embodiment of the function corresponding to FIG. 4 and Eq. 4.

FIG. 17 is an illustration describing an exemplary embodiment of the function corresponding to FIG. 5 and Eq. 5.

Figure 1:
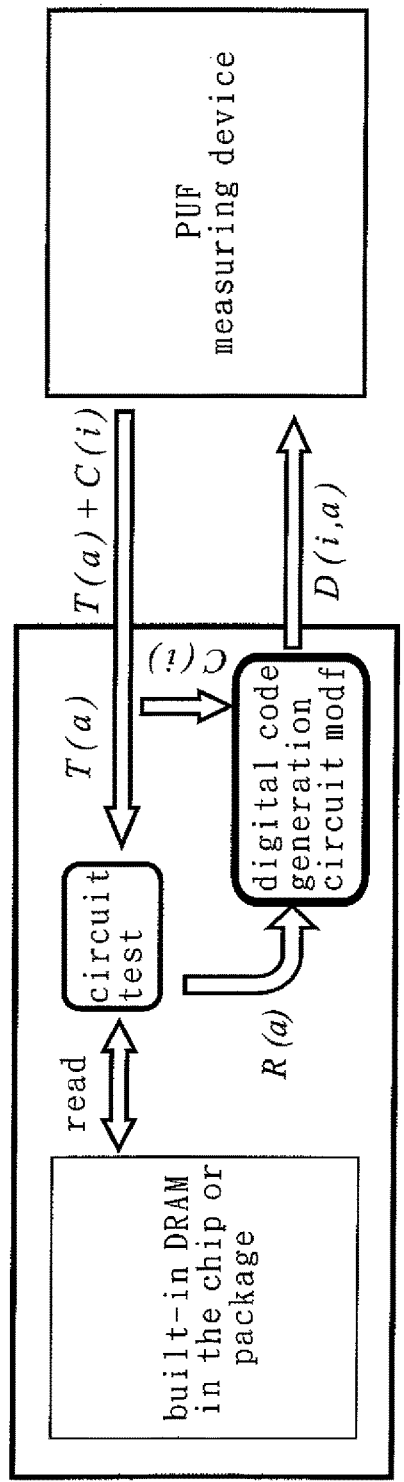
FIG. 1 is an illustration describing an example of a method to generate an output identification code from an input identification code with regard to a PCID measuring device of the present invention and the chip to be identified.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

The embodiments related to the present invention will be explained with the detailed description given hereinafter and the accompanying drawings. Moreover, in the below, the redundant addresses of the bit lines of DRAM may be described as an example of random number generated from physical properties intrinsic to semiconductor chip. However, the essence of the present invention is not limited to that, but rather covers all memory products equipped with a fuse in the peripheral of the memory area such as word lines or a power adjuster, or the entire semiconductor products adopting a fuse therein. Moreover, the embodiments that will be disclosed in the present document may are examples and the essence of the present invention is not to be limited to these examples.

The first embodiment of the invention is discussed below.

FIG. 1 illustrates a scheme of identification procedures from an input identification code to an output identification code, in which a PCID measuring device identifies the chip to be identified. A semiconductor apparatus includes at least the chip to be identified. The chip to be identified may include a modular region including a plurality of modular areas (each being a semiconductor memory area). Each modular area comprises at least a memory cell array (e.g., DRAM) and a peripheral memory area (e.g., a fuse memory area). The memory cell array may include redundant bit lines. The peripheral memory area may store redundancy addresses and other codes necessary to the memory control (e.g., voltage regulation codes and so on). The peripheral memory area may be, for example, fuse memory. The chip to be identified may also include a test circuit to measure the redundant addresses of the bit lines of DRAM.

Moreover, the chip to be identified may include a digital code generation circuit labeled as "modf" to output the output identification code from the input identification code and the redundant addresses of the bit lines of DRAM.

The PCID measuring device may send a special test mode $\{T(a)\}$ and an input identification code $\{C(i)\}$ to the chip to be identified, to detect the redundant address. The function $\{C(i)\}$ has an argument which is a variable chip identification code $\{i\}$. The function $\{T(a)\}$ has an argument which is a specification code $\{a\}$ to specify a reading area of the redundant addresses of the bit lines or a reading mode. The test circuit may read the data of the redundant addresses (which are randomly formed related to a part of a whole of the modular area) and then send the read result $\{R(a)\}$ to the digital code generation circuit (modf), where $\{R(a)\}$ may be the output of a random number generated from the physical properties intrinsic to the chip to be identified with respect to the specification code $\{a\}$. The digital code generation circuit (modf) may generate an output identification code $\{D(i,a)\}$ according to a specified manner, which may be to add $\{C(i)\}$ and $\{R(a)\}$ according to equation 1, and then send the output identification code $\{D(i,a)\}$ to the PCID measuring device. The PCID measuring device may execute the identification of the chip to be identified by checking $\{a\}$, $\{C(i)\}$, and $\{D(i,a)\}$.

$$D(i,a)=\mod f(C(i)+R(a)) \qquad (1).$$

FIG. 13 illustrates an embodiment of equation 1 shown in FIG. 1. The figures may illustrate just one of the examples of the present invention, and the essence of the present invention is not to be limited to the examples illustrated.

The second embodiment of the invention is discussed below.

Figure 2:
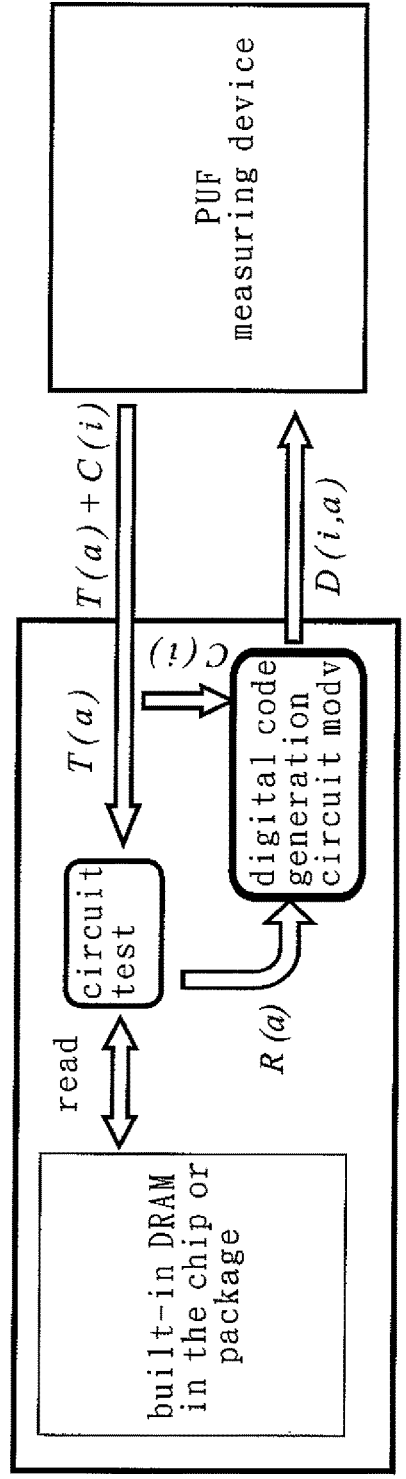
FIG. 2 is an illustration describing an example of a method to generate an output identification code from an input identification code with regard to a PCID measuring device of the present invention and the chip to be identified.

FIG. 2 illustrates a scheme of identification procedures from an input identification code to an output identification code, in which a PCID measuring device identifies the chip to be identified. For example, the chip to be identified may include a test circuit to measure redundant addresses of the bit lines of a DRAM. For example, moreover, the chip to be identified may include a digital code generation circuit (modv) to output the output identification code from the input identification code and the redundant addresses of bit lines of the DRAM. The program of this digital code generation circuit (modv) may be modifiable.

The PCID measuring device may send a special test mode $\{T(a)\}$ and an input identification code $\{C(i)\}$ to the chip to be identified, to detect the redundant address. The function $\{C(i)\}$ has an argument which is a variable chip identification code $\{i\}$. The function $\{T(a)\}$ has an argument which is a specification code $\{a\}$ to specify a reading area of the redundant addresses of the bit lines or a reading mode. The test circuit may read the data of the redundant addresses and then send the read result $\{R(a)\}$ to the digital code generation circuit (modv), where $\{R(a)\}$ may be the output of a random number generated from the physical properties intrinsic to the chip to be identified with respect to the specification code $\{a\}$. The digital code generation circuit (modv) may generate an output identification code $\{D(i,a)\}$ from $\{C(i)\}$ and $\{R(a)\}$ according to equation 2, and then send the $\{D(i,a)\}$ to the PCID measuring device. The PCID measuring device may execute the identification of the chip to be identified by checking $\{a\}$, $\{C(i)\}$, and $\{D(i,a)\}$.

$$D(i,a)=\mod v(C(i)+R(a)) \qquad (2).$$

FIG. 14 illustrates an embodiment of equation 2 shown in FIG. 2. The figures may illustrate just one of the examples of the present invention, and the essence of the present invention is not to be limited to the examples illustrated.

The third embodiment of the invention is discussed below.

FIG. 3 illustrates a scheme of identification procedures from an input identification code to an output identification code, in which a PCID measuring device identifies the chip to be identified. For example, the chip to be identified may include a test circuit to measure redundant addresses of the bit lines of a DRAM. For example, moreover, the chip to be identified may include the digital code generation circuit (modf) to output the output identification code from the input identification code and the redundant addresses of the bit lines of the DRAM.

The PCID measuring device may send a special test mode $\{T(a)\}$ to the chip to be identified, in order to detect the redundant address. The function $\{T(a)\}$ has an argument which is a specification code $\{a\}$ to specify a reading area of the redundant addresses of the bit lines or a reading mode. The specification code $\{a\}$ may be used as an input identification code as well. The test circuit may read the data of the redundant addresses and then send the read result $\{R(a)\}$ to the digital code generation circuit (modf), where $\{R(a)\}$ may be the output of a random number generated from the physical properties intrinsic to the chip to be identified with respect to the specification code $\{a\}$. The digital code generation circuit (modf) may generate an output identification code $\{D(a)\}$ from $\{R(a)\}$ according to equation 3, and then send the output identification code $\{D(a)\}$ to the PCID measuring device. The PCID measuring device may execute the identification of the chip to be identified by checking $\{a\}$ and $\{D(a)\}$.

$$D(a)=\mod f(R(a)) \qquad (3).$$

FIG. 15 illustrates an embodiment of equation 3 shown in FIG. 3. The figures may illustrate just one of the examples of the present invention, and the essence of the present invention is not to be limited to the examples illustrated.

The fourth embodiment of the invention is discussed below.

FIG. 4 illustrates a scheme of identification procedures from an input identification code to an output identification code, in which a PCID measuring device identifies the chip. For example, the chip to be identified may include a test circuit to measure the redundant addresses of the bit lines of a DRAM. For example, moreover, the chip to be identified may include a digital code generation circuit (modv) to output the output identification code from the input identification code and the redundant addresses of the bit lines of the DRAM. The program of this digital code generation circuit (modv) may be modifiable.

The PCID measuring device may send a special test mode $\{T(a)\}$ to the chip to be identified, in order to detect the redundant address. The function $\{T(a)\}$ has an argument which is a specification code $\{a\}$ to specify a reading area of the redundant addresses of the bit lines or a reading mode. The $\{a\}$ may be used as an input identification code as well. The test circuit reads the data of the redundant addresses and then sends the read result $\{R(a)\}$ to the digital code generation circuit (modv), where $\{R(a)\}$ is the output of a random number generated from the physical properties intrinsic to the chip to be identified with respect to the specification code $\{a\}$. The digital code generation circuit (modv) generates an output identification code $\{D(a)\}$ from the $\{R(a)\}$ according to equation 4, and then sends the output identification code $\{D(a)\}$ to the PCID measuring device. The PCID measuring device executes the identification of the chip to be identified by checking $\{a\}$ and $\{D(a)\}$.

$$D(a) = \mod v(R(a)) \quad (4).$$

FIG. 16 illustrates an embodiment of equation 4 shown in FIG. 4. The figures may illustrate just one of the examples of the present invention, and the essence of the present invention is not to be limited to the examples illustrated.

The fifth embodiment of the invention is discussed below.

Figure 5:
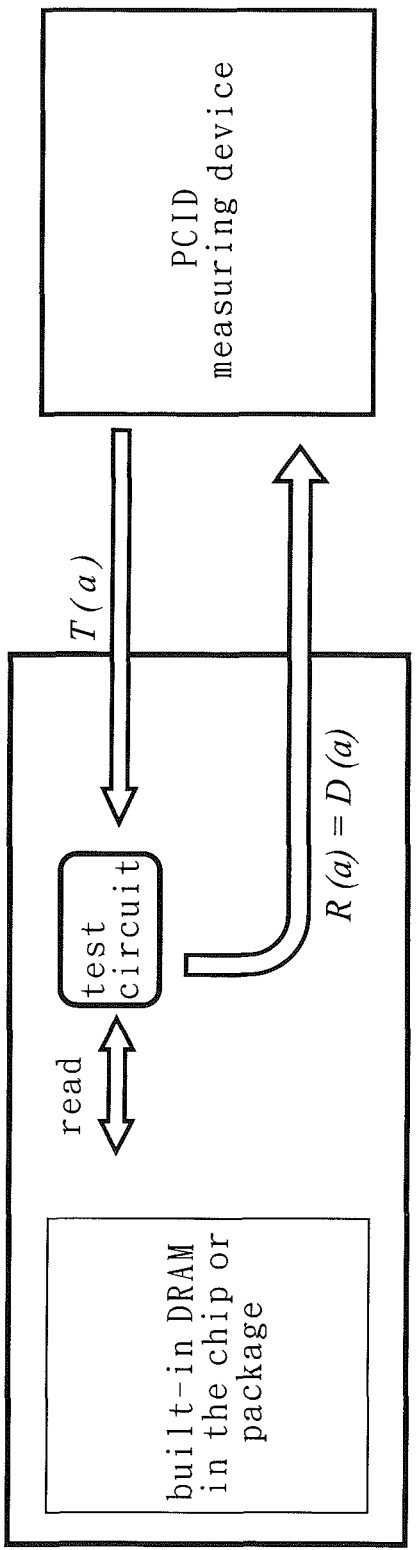
FIG. 5 is an illustration describing an example of a method to generate an output identification code from an input identification code with regard to a PCID measuring device of the present invention and the chip to be identified.

FIG. 5 illustrates a scheme of identification procedures from an input identification code to an output identification code, in which a PCID measuring device identifies the chip. For example, the chip to be identified may include a test circuit to measure the redundant addresses of the bit lines of DRAM.

The PCID measuring device may send a special test mode $\{T(a)\}$ to the chip to be identified, in order to detect the redundant address. The function $\{T(a)\}$ has an argument which is a specification code $\{a\}$ to specify a reading area of the redundant addresses of the bit lines and a reading mode. The $\{a\}$ may be used as a PCID identification code as well. The test circuit may read the data of the redundant addresses, regard the read result $\{R(a)\}$ as the output identification code $\{D(a)\}$ according to equation 5, and send it to the PCID measuring device. The PCID measuring device may execute the identification of the chip to be identified by checking $\{a\}$ and $\{D(a)\}$.

$$D(a) = R(a) \quad (5).$$

FIG. 17 illustrates an embodiment of equation 5 shown in FIG. 5. The figures may illustrate just one of the examples of the present invention, and the essence of the present invention is not to be limited to the examples illustrated.

The sixth embodiment of the invention is discussed below.

Figure 6:
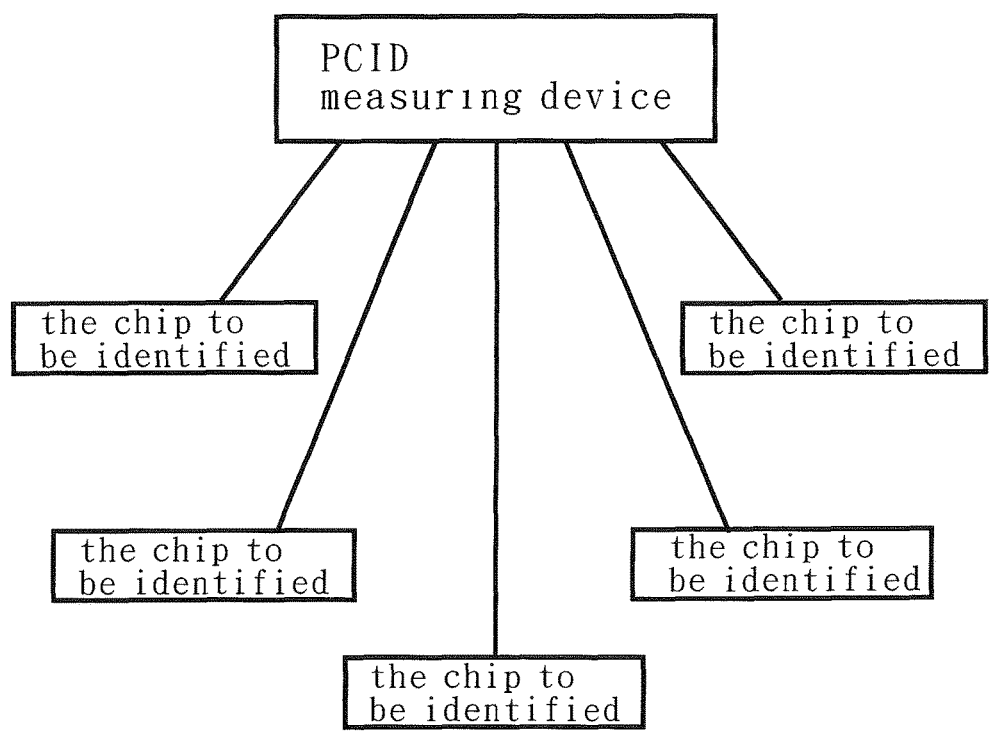
FIG. 6 is an illustration describing an example of a network including a PCID measuring device of the present invention and the device equipped with the PCID (PCID devices).

As an example as shown in FIG. 6, the present invention may be a network in which a plurality of chips to be identified (including PCID devices) may connect to a PCID measuring device. The number of the chips to be identified and connecting to one PCID measuring device may be limitless. Moreover, the PCID measuring device may be administrated especially securely.

The seventh embodiment of the invention is discussed below.

Figure 7:
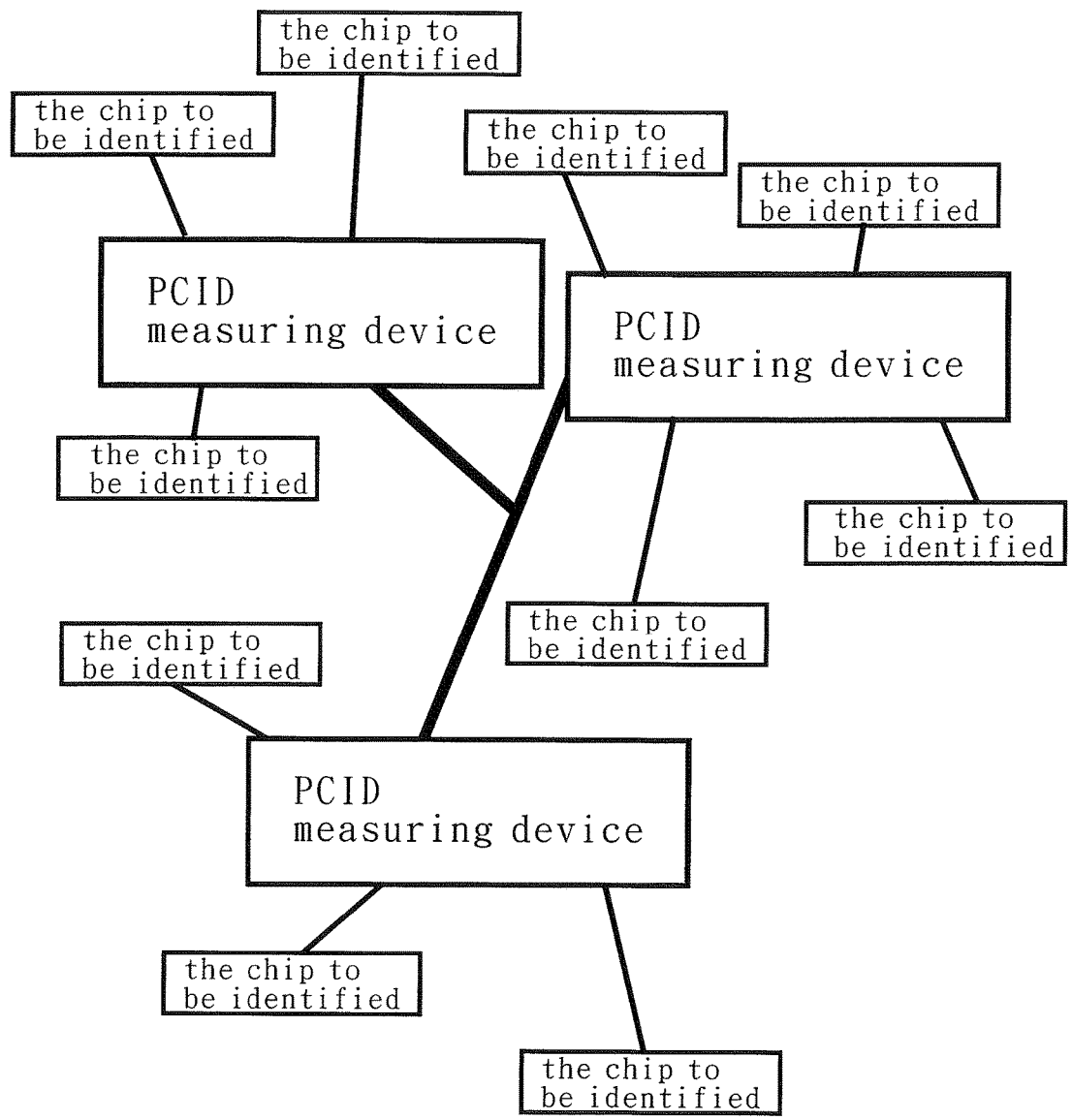
FIG. 7 is an illustration describing an example of a network including a PCID measuring device of the present invention and the device equipped with the PCID (PCID devices).

As an example as shown in FIG. 7, the present invention may be a network including a plurality of network units in which a plurality of chips to be identified may connect to a PCID measuring device. The number of chips to be identified and composing each network unit may be limitless. The connections between the network units may be formed of connections between the PCID measuring devices respectively included in those network units. Moreover, the PCID measuring device may be administrated especially securely.

The eighth embodiment of the invention is discussed below.

Figure 8:
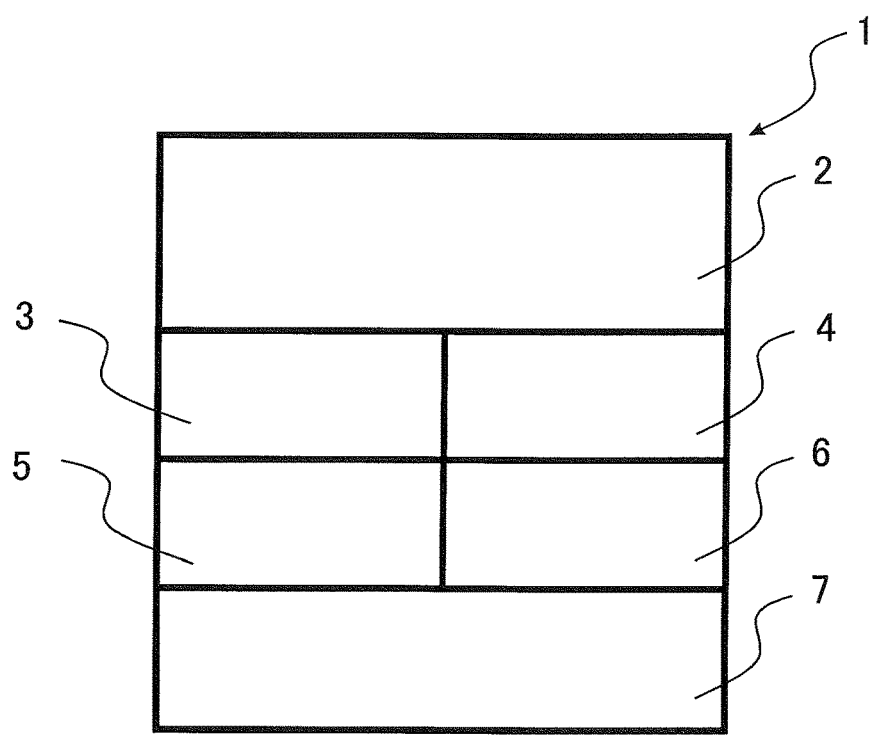
FIG. 8 is an illustration describing an example of SIP.

As shown in FIG. 8, generally at least one DRAM chip 4 may be adopted into System-in-Package (SiP) 1 which may package a set of a plurality of semiconductor chips. Accordingly, it may be possible that individual differences of the redundant addresses of bit lines of a DRAM in SiP may serve as PCID for the SiP chip. Moreover, the combinations of packaged chips may be various and not limited to this figure. The example of the SiP includes a processor 2, a nonvolatile memory 3, an analog unit 5, a radiofrequency unit 6, and a sensor 7.

The ninth embodiment of the invention is discussed below.

Figure 9:
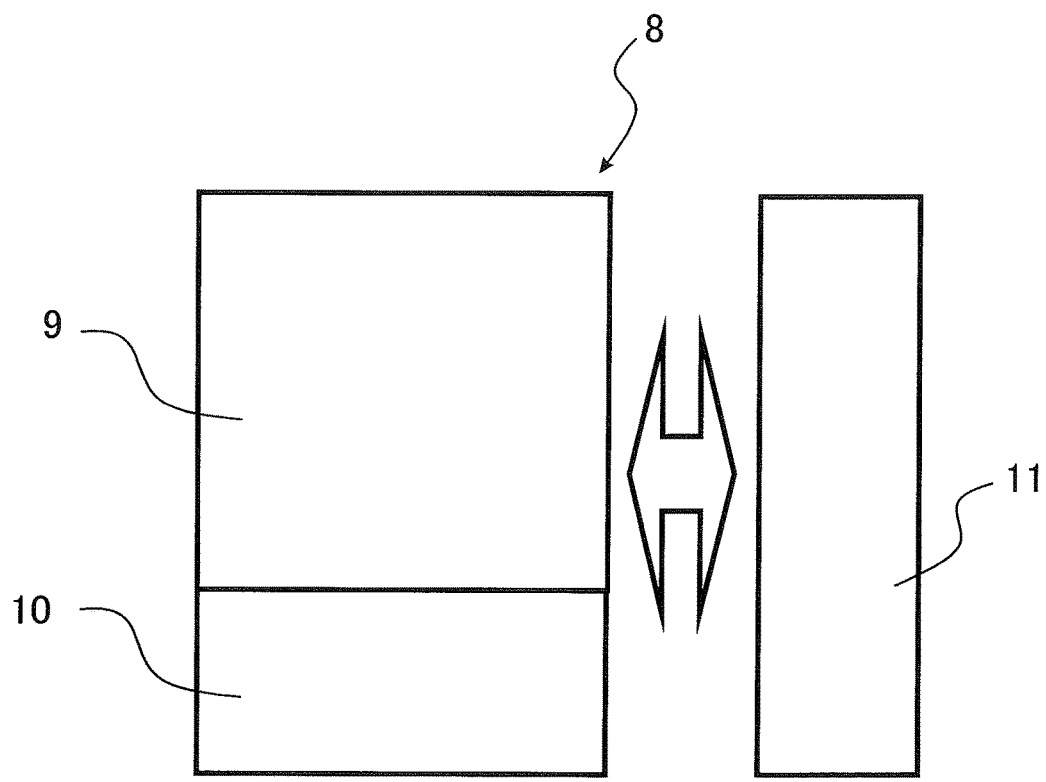
FIG. 9 is an illustration describing an example of a processor equipped with a built-in DRAM.
Figure 10:
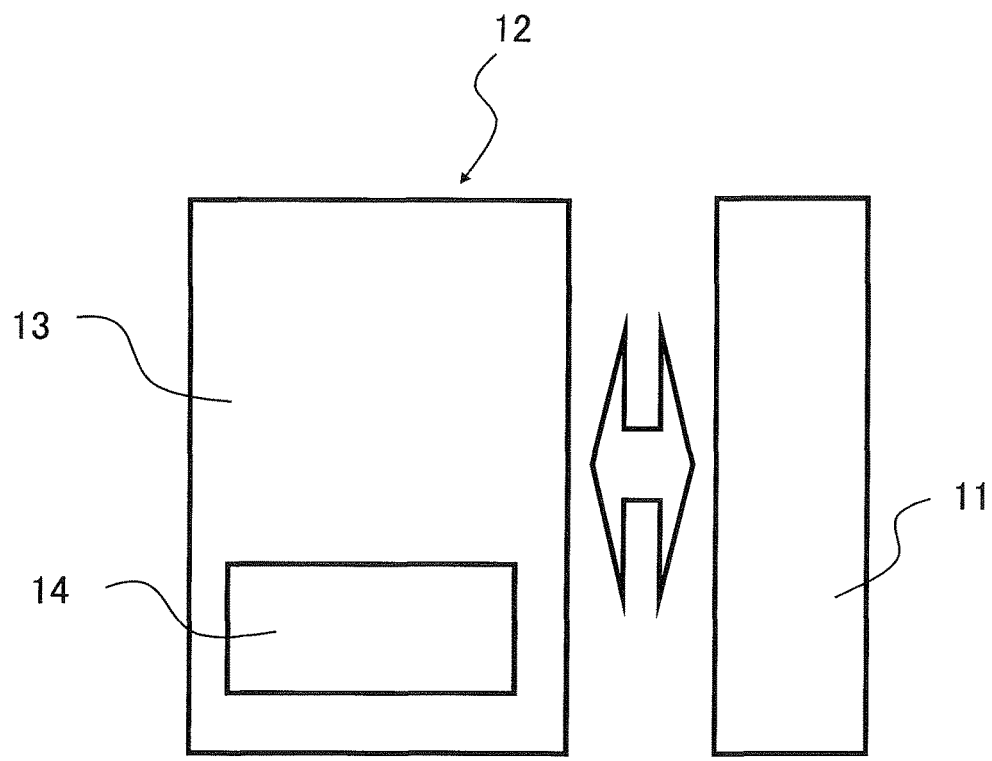
FIG. 10 is an illustration describing an example of a processor equipped with a built-in DRAM.

In the case where a built-in DRAM 10 as well as a processor 9 make up a package 8, as shown in FIG. 9, the individual differences of the redundant addresses of the bit lines of the built-in DRAM 10 may serve as a PCID for the processor 9 in the package 8. Moreover, as shown in FIG. 10, when a built-in DRAM 14 is equipped inside a processor chip 12, the individual differences of the redundant addresses of the built-in DRAM 14 may serve as a PCID for a processor 13. The example of the processor including the built-in DRAM 14 can use an external DRAM 11 as well.

The tenth embodiment of the invention is discussed below.

A DRAM memory cell array may include excess bit lines (redundant bit lines) to compensate for bit lines which have irreversible error bits and are then excluded. This exclusion may be executed by respectively re-assigning addresses of the bit lines to be excluded to those of redundant bit lines. The addresses of the redundant bit lines to be used for the re-assignment are redundant addresses. In this way, if an excluded bit line is accessed, a corresponding redundant address is called.

Figures 11, 12:
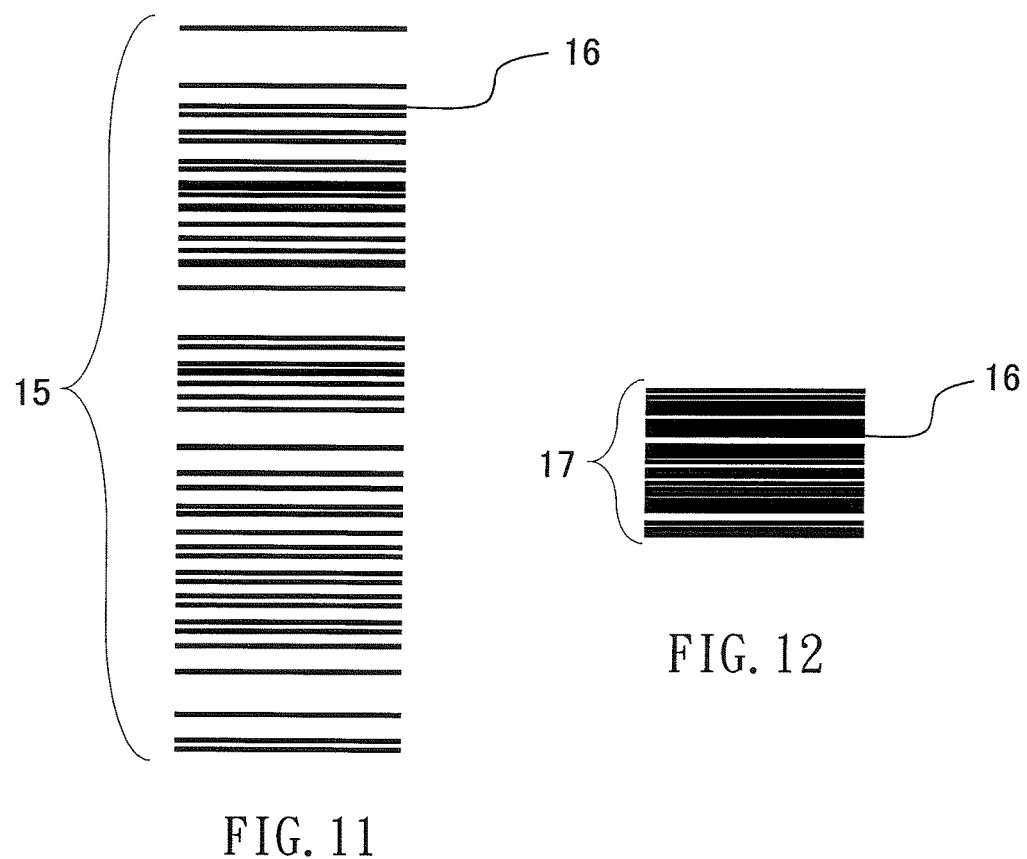
FIG. 11 is an illustration describing an example wherein the bit line addresses of the DRAM memory cells are arranged vertically with the redundant addresses of used bit lines being colored black.
FIG. 12 is an illustration describing an example wherein the addresses of the entire redundant bit lines are arranged vertically with the redundant addresses of used bit lines being colored black.

In FIG. 11, the bit lines 15 running horizontally and respectively connecting a plurality of DRAM memory cells may be arranged vertically. The addresses of the bit lines may be allocated to rows, respectively. Some of the bit lines may have irreversible error bits and then be excluded. The excluded bit lines 16 (re-allocated to the corresponding redundant addresses) are colored black in the figure. The amount of the black lines may show that plenty of bit lines are used as the redundancy. In a normal access mode in which every memory cell is accessed normally, it may be impossible to distinguish which addresses are re-allocated to redundant addresses. However, it may be presumably possible that the redundant addresses may become distinguishable by using a special test mode. Thus, this figure illustrates that the distribution of the redundant addresses is a physical property intrinsic to the DRAM chip and is applicable to serve as a PCID to identify the DRAM chip. It may be also possible to scramble the distribution of the redundant addresses by artificially precluding a part of the addresses, by multiplying some addresses, or by combining a plurality of methods.

As a result, and as shown in this figure, a pattern like barcode may be formed related to the chip to be identified.

The eleventh embodiment of the invention is discussed below.

As shown in FIG. 12, only the redundant bit lines 17 of a DRAM chip are arranged vertically with the redundant addresses of the used redundant bit lines 16 (re-allocated to the excluded bit lines) colored black. In this way, it may be found that plenty of redundant bit lines have been used for the re-allocation. In a normal access mode in which every memory cell is accessed normally, it may be impossible to distinguish which addresses are re-allocated to redundant address. However, it may be presumably possible that the redundant addresses may become distinguishable by using a special test mode. Thus, this figure may illustrate that the distribution of redundant addresses is a physical property intrinsic to the DRAM chip and is applicable as a PCID to identify a DRAM chip. It may be also possible to scramble the distribution of the redundant addresses by artificially precluding a part of the addresses, by multiplying some addresses, or by combining a plurality of methods. As a result, and as shown in this figure, a pattern like barcode may be formed related to the chip to be identified.

The present invention may be related to a system of a PCID for distinguishing an individual difference of semiconductor memory chips by using the distribution pattern of the redundant addresses having been found in conventional semiconductor memory devices. This system may include a reading circuit for reading data of addresses of the redundant bit lines in a predetermined area of the semiconductor memory chip, a digital code generation circuit for generating an output identification code from the read data of the addresses of the redundant bit lines and so on. Particularly in a DRAM which is a typical memory device, the redundant addresses corresponding to the re-allocated bit lines may be randomly generated. The number of cases of randomness (Information Entropy) may be great and enough to distinguish the individual difference among a huge number of semiconductor devices. Furthermore, if a redundant code to acquire data related to redundant addresses is copied from one DRAM chip to another DRAM chip, the copied and required redundant codes may be mismatched in the chip copied with the redundant code. A malfunction may thus occur in the DRAM chip copied with the redundant code. By doing so, copy protection may be provided as well. In addition, DRAM has been widespread and also extensively used in SiP as a built-in DRAM, which may permit the PCID to be equipped in a same package or on a same chip.

The present invention products PCIDs with low cost and high reliability for products including fuses, products in which the package having fuses may be included, or products having a chip in which the devices with fuses may be embedded, such as DRAM, processors with built-in DRAM, SIP, SRAM, built-in SRAM, field programmable gate array (FPGA), nonvolatile memories and so forth.

In the followings, the problems to be solved by the invention are discussed.

A test circuit to read the physical properties of the semiconductor chip generating the random numbers from the physical properties intrinsic to the semiconductor chip may be incorporated inside the chip or package.

A digital code generation circuit to generate an output identification code (response) from a random number generated from the physical properties intrinsic to the chip in response to an input identification code (challenge) may be incorporated as well as the above mentioned test circuit for the reading operation in the chip or package.

The above-mentioned test circuit and digital code generating circuit may be called PCID devices together. The redundant addresses found in the semiconductor devices may be used to identify the individual differences of the semiconductor chips.

The effects of the invention are discussed below.

The circuit incorporated in the semiconductor chip or package for reading the random numbers from the physical properties intrinsic to the chip may operate with special commands to be specially used for reading data from inside chip. This may, as a result, improve security. Moreover, the random number to be output may be made unspecified by designating an area or pattern from which the physical properties intrinsic to the chip may be read. In addition, the incorporated circuit may be designed only for reading, the circuit area of which may be negligibly small compared with the memory cell array.

The circuit incorporated in the semiconductor chip or package for generating an output identification code may generate an unspecified output identification code (response) from a random number generated from the physical properties intrinsic to the chip in response to an input identification code (challenge). The program to generate an output identification code may be changeable. In addition, the incorporated circuit may be designed only for generating the random number codes, and the corresponding circuit area may be negligibly small and be inaccessible from main processor unit.

In an example of 4Gb DRAM products, there may be approximately 153 thousands bit lines left as is as redundant bit lines, while the total number of bit lines may be 655 million. Thus, the number of permutations may be more than five times of ten to the power of 1,042,102. In other words, the physical randomness intrinsic to the semiconductor chip may be actually infinite. This size of the randomness may be sufficient to identify the individual difference due to the physical properties intrinsic to the semiconductor chips to be used even in a huge network like IoT.

For example, in conventional DRAM chips, a fuse memory to be used for recording at least redundant addresses may be built into the DRAM chips. Thus, since the fuse memory has been used in commercial products, the reliability of the fuse memory may have already been validated as a mass-product.

For example, in conventional DRAM chips, the fuse memory to be used for recording at least the redundant addresses may be built into the DRAM chips. Thus, the fuse memory may not be added to any memory area. Accordingly, no memory cells, no decoders, and no sense-amplifiers may be added to the chip and the increasing cost of this invention may be negligibly small.

For example, in most conventional DRAM chips, so that chip manufacturers may test the manufactured chips, a circuit to read at least the redundant addresses may have been incorporated with a special test mode. By doing so, the present invention may be launched without additional circuits related to the read circuit.

For example, in most conventional DRAM chips, the code to acquire data related to redundant addresses (redundant code) may be compressed with no leak of information of randomness and then recoded in the fuse memory including a smaller number of fuse cells than the number of entire bit lines. By doing so, a larger number of address data of bit lines than the number of fuse cells may be available.

For example, in conventional DRAM chips, if a redundant code is copied from one DRAM chip to another DRAM chip, the copied and required redundant codes may be mismatched, and the chip copied with the redundant code may then cause the malfunction of the chip. By doing so, copy protection may be provided as well, since the chip copied with the redundant code cannot sufficiently work as DRAM product.

As examples of the conventional DRAM chips, the stand-alone DRAM and built-in DRAM chips for system-in package (SIP hereinafter) may have been extensively used in many consumer products and industrial equipment such as personal computers, smart phones, mobile phones, printers, copying machines, televisions, communication devices, apparatus and facilities. Thus, the application of PCID may be developed in the wide field of those products.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A semiconductor apparatus comprising:
   a semiconductor chip comprising:
   a modular region comprising a plurality of modular areas each comprising a memory cell array with redundant bit lines and a peripheral memory area storing at least redundant addresses; and
   a test circuit retrieving the redundant addresses intrinsic to the semiconductor chip by using a special test mode provided by a physical-chip-identification measuring device, wherein a distribution of the retrieved redundant addresses is randomly formed related to a part or an entirety of the modular area of the modular region, wherein the distribution of the retrieved redundant addresses is irreversible, wherein a random number represents physical properties intrinsic to the semiconductor chip and provides a copy protection wherein when another semiconductor chip uses the distribution of the retrieved redundant addresses the another semiconductor chip will malfunction, and
   wherein the test circuit outputs the random number generated from the distribution of the retrieved redundant addresses according to a specification code received from the physical-chip-identification measuring device.

2. The semiconductor apparatus as claimed in claim 1, wherein the semiconductor chip further comprises a digital code generation circuit, and wherein the digital code generation circuit generates an output identification code using the random number according to a specified manner.

3. The semiconductor apparatus as claimed in claim 2, wherein the test circuit combines the random number with an input identification code in order for the digital code generation circuit to generate the output identification code, and wherein the input identification code is received from the physical-chip-identification measuring device.

4. The semiconductor apparatus as claimed in claim 2, wherein the digital code generation circuit is an incorporated circuit inside the semiconductor chip and is program-modifiable.

5. The semiconductor apparatus as claimed in claim 1, wherein the semiconductor chip further comprises a digital code generation circuit, wherein the digital code generation circuit generates an output identification code according to the random number, and wherein the output identification code is sent to the physical-chip-identification measuring device.

6. The semiconductor apparatus as claimed in claim 2, wherein the digital code generation circuit generates the output identification code according to the random number, and wherein the output identification code is sent to the physical-chip-identification measuring device.

7. The semiconductor apparatus as claimed in claim 1, wherein the modular area is a semiconductor memory area.

8. The semiconductor apparatus as claimed in claim 5, wherein the semiconductor chip is packed into a package, and wherein the output identification code is used as the output identification code of the package.

9. The semiconductor apparatus as claimed in claim 6, wherein the semiconductor chip is packed into a package, and wherein the output identification code is used as the output identification code of the package.

* * * * *